Figure 1:
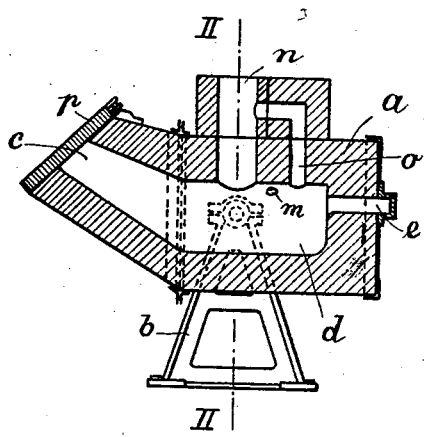

A. NIELSEN.
APPARATUS FOR THE PRODUCTION OF STEEL DIRECTLY FROM PIG IRON.
APPLICATION FILED AUG. 6, 1918.

1,318,906.

Patented Oct. 14, 1919.

Inventor
Alfred Nielsen
By Knight Bros
Attys

UNITED STATES PATENT OFFICE.

ALFRED NIELSEN, OF COPENHAGEN, DENMARK.

APPARATUS FOR THE PRODUCTION OF STEEL DIRECTLY FROM PIG-IRON.

1,318,906. Specification of Letters Patent. Patented Oct. 14, 1919.

Application filed August 6, 1918. Serial No. 248,651.

*To all whom it may concern:*

Be it known that I, ALFRED NIELSEN, engine-builder, subject of the King of Denmark, residing at Copenhagen, Denmark, have invented certain new and useful Improvements in Apparatus for the Production of Steel Directly from Pig-Iron, of which the following is a specification.

The invention relates to an apparatus for production of steel directly from pig iron. The distinguishing feature of the apparatus is mainly that the fusion of the pig iron takes place in the same specially shaped converter which is used for the conversion of the iron into steel, the converter occupying, during the melting process, a more or less horizontal position. For this purpose the converter is fitted, at or near its bottom, with one or more twyers for a mixture of compressed air with atomized liquid fuel, gas or the like and, at a suitable place, preferably about at the center, a pocket for solid pig iron, communicating with the converter. During the melting the converter is, as mentioned above, swung in a horizontal position, so that the pig iron pocket is turning upward, and the discharge spout of the converter is kept closed by a cover. When the flame is lighted, the combustion gases will escape by way of the pig iron pocket, thereby causing the pig iron to melt and flow down in the converter. When the melting is finished, the converter is returned to the ordinary erect position, after the bottom twyer has been closed by means of a plug or the like, and blast is now introduced, as usual by way of one or more suitable channels, the combustion gases escaping through the pig iron pocket or, if the latter is closed, then by way of the now open discharge spout of the converter.

The invention is intended to be used mainly in ordinary machine shops and manufacturing establishments where the object aimed at is not to produce, in strictly economical manner, large quantities of steel castings but rather to be able to produce, at any time and without long preparations or a large plant, smaller quantities of steel castings.

One manner of constructing the apparatus is illustrated on the drawing, where—

Figure 3:
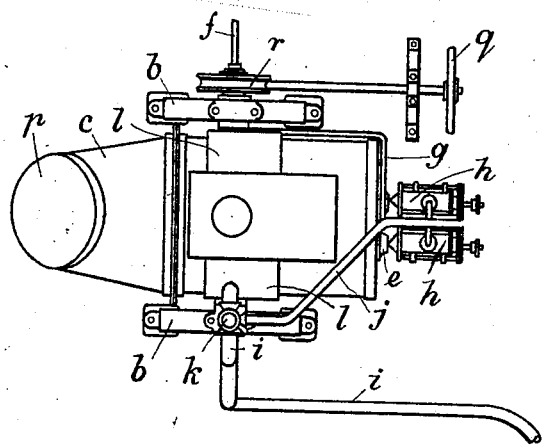
Figure 2:
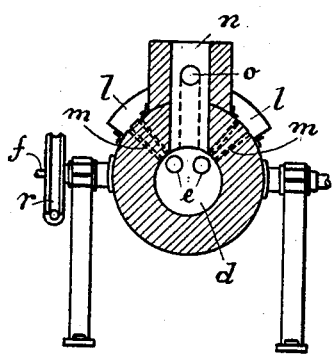
Figure 4:
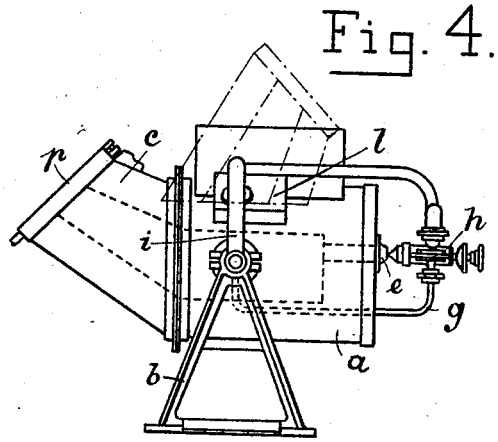

Figure 1 is a longitudinal section of the apparatus occupying the melting position and with pig iron filled in, and Fig. 2 a cross-section along the line II—II of Fig. 1, Figs. 3 and 4 show, in top-view and in elevation, respectively, the apparatus occupying the melting position.

Referring to the drawing, $a$ is the converter fitted with trunnions journaled in fixed floor-stands $b$. As shown in Figs. 1 and 3, the converter is fitted with a spout (discharge opening) $c$ whose axis is more or less inclined relatively to the axis of the working chamber $d$, so that the spout will occupy an upwardly slanting position, when the converter is turned into its horizontal position. In the bottom of the converter there are one or more twyers $e$ (two in the manner of construction shown) for liquid fuel atomized in compressed air, for instance oil or the like or a mixture of air and gas. This fuel is admitted to the converter through a supply pipe $f$ leading to one of the trunnions of the converter, the said trunnion being hollow and forming a connecting sleeve between the pipe $f$ and a tube $g$ conveying the oil (the gas) from the said trunnion to atomizing burners $h$ placed in front of the twyers $e$ (Figs. 3 and 4).

The blast is conveyed through a pipe $i$, leading from a suitable blast generator, and another pipe $j$ to the burners $h$.

The pipe $j$ communicates with the tube $i$ at the other trunnion of the converter (Figs. 3 and 4) and, between these two pipes, there is inserted a three-way valve $k$ by means of which the blast may be directed either through the blast-pipe $i$ to the burners $h$ or to one or more chambers $l$ (Fig. 2) on the top side of the converter from which chambers the air is directed through blast-channels $m$ into the converter, when the refining of the molten iron into steel is to take place, after the converter has been swung into erect position.

$n$ is the pig iron pocket communicating with the working chamber $d$ of the converter, the said pocket being attached to one side of the converter and, consequently, having to follow its rotation. A by-passage $o$ serves to secure, at all times, a free outlet from the working chamber $d$, even if the melting pig iron might prevent the free passage of the combustion gases through the lower portion of the pocket $n$. The converter's spout may be closed by a cover $p$ during the melting and, maybe, also during the refining. The converter may be swung about its trunnions by means of a hand-wheel $q$ with worm and worm-wheel $r$.

The apparatus is used in the following manner:

The converter is placed in the lying position shown in the drawing, so that its axis becomes horizontal or nearly horizontal, and the pig-iron pocket $n$ points upward, whereafter it is filled to a suitable height. The reversing valve $k$ is adjusted so that the blast may pass through the tube $i$ to the burners $h$. Then the flow of fuel and blast is opened, and the combustible mixture, now passing from the burners $h$ into the converter, through the twyers $e$, is ignited and burns in the converter, producing in the converter a heat so intense that the pig iron gradually melts and collects in the lower portion of the converter. When the pig iron is melted, the supply of oil, gas or any other fuel used, is stopped, the twyers $e$ are closed by plugs or the like of fireproof material, the valve $k$ is reversed so that the air is now not conveyed to the burners $h$, but to the chambers $l$ and thence, through the twyers $n$, to the chamber $d$. The converter is then swung into vertical position, so that its spout $c$ is caused to occupy the position shown by dotted lines in Fig. 4. The liquid cast iron is now refined, in known manner by action of the blast admitted through the channels $m$.

Having now particularly described and ascertained the nature of my said invention and in what manner the same is to be performed, I declare that what I claim is:—

1. In an apparatus for production of steel directly from pig iron the combination of a converter rotatable about a horizontal axis, a number of ordinary blast-twyers $m$ in the side of the converter, a number of burner twyers $e$, at or near the bottom, serving as inlets for a mixture of compressed air and gas or atomized fuel, and, at the side, a pocket $n$ for the pig iron, said pocket communicating with the converter's working chamber.

2. In an apparatus for production of steel directly from pig iron the combination of a converter rotatable about a horizontal axis, a number of ordinary blast-twyers $m$ in the side of the converter, a number of burner twyers $e$, at or near the bottom, serving as inlets for a mixture of compressed air and gas or atomized fuel, and, at the side, a pocket $n$ for the pig iron, said pocket communicating with the converter's working chamber, and a by-pass channel $o$ from the converter's working chamber $d$ to the upper portion of the pig iron pocket $n$.

3. In an apparatus for production of steel directly from pig iron the combination of a converter rotatable about a horizontal axis, a number of ordinary blast-twyers $m$ in the side of the converter, a number of burner twyers $e$, at or near the bottom, serving as inlets for a mixture of compressed air and gas or atomized fuel, and, at the side, a pocket $n$ for the pig iron, said pocket communicating with the converter's working chamber, and a by-pass channel $o$ from the converter's working chamber $d$ to the upper portion of the pig iron pocket $n$, and means for closing the converter's discharge opening during the melting process, the pocket $n$ then serving as an outlet for the combustion gases.

4. In an apparatus for production of steel directly from pig iron the combination of a converter rotatable about a horizontal axis, a number of ordinary blast-twyers $m$ in the side of the converter, a number of burner twyers $e$, at or near the bottom, serving as inlets for a mixture of compressed air and gas or atomized fuel, and, at the side, a pocket $n$ for the pig iron, said pocket communicating with the converter's working chamber, and a by-pass channel $o$ from the converter's working chamber $d$ to the upper portion of the pig iron pocket $n$, a three-way valve $k$ in the blast supply pipe, said valve serving for conveying the blast at will to the burner twyers $e$ or to the blast twyers $m$, and means for closing the converter's discharge opening during the melting process, the pocket $n$ then serving as an outlet for the combustion gases.

In testimony whereof the foregoing specification is signed.

ALFRED NIELSEN.

Copies of this patent may be obtained for five cents each, by addressing the "Commissioner of Patents, Washington, D. C."